(No Model.)

W. D. SCHUYLER.
SUPPLY AND DRAIN PIPE CONNECTION FOR WASH STANDS.

No. 355,345. Patented Jan. 4, 1887.

WITNESSES:

INVENTOR:
W. D. Schuyler
BY
ATTORNEYS.

(No Model.) 2 Sheets—Sheet 2.
W. D. SCHUYLER.
SUPPLY AND DRAIN PIPE CONNECTION FOR WASH STANDS.
No. 355,345. Patented Jan. 4, 1887.
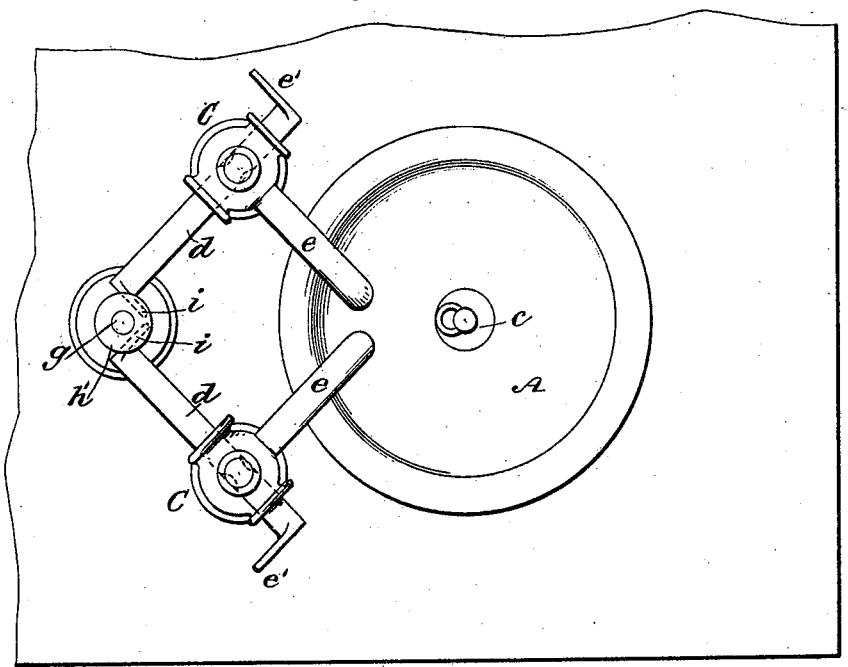
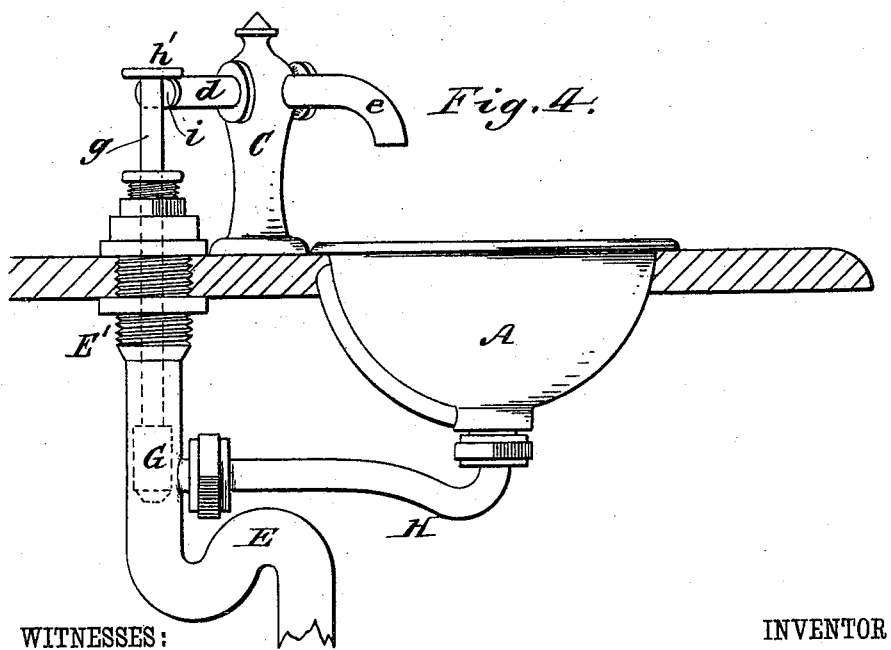

UNITED STATES PATENT OFFICE.

WILLIAM D. SCHUYLER, OF NEW YORK, N. Y.

SUPPLY AND DRAIN PIPE CONNECTION FOR WASH-STANDS.

SPECIFICATION forming part of Letters Patent No. 355,345, dated January 4, 1887.

Application filed December 9, 1885. Serial No. 185,190. (No model.)

*To all whom it may concern:*

Be it known that I, WILLIAM D. SCHUYLER, of the city, county, and State of New York, have invented new and useful Improvements in Supply and Drain Pipe Connections for Stationary Wash Stands or Basins, &c., of which the following is a full, clear, and exact description.

This invention relates to supply and drain pipe connections for stationary wash-basins and other water fixtures or structures in which the supply valve or valves is or are connected by flexible attachments or lifters with a weighted plunger or other suitable valve arranged to automatically close the drain-pipe connection, so as to exclude sewer and other offensive or injurious odors and gases from passing up through the basin or receptacle when the supply valve or valves is or are shut, but which is lifted or opened by the action of the supply valve or valves when opened to allow of waste water escaping from the basin or receptacle.

The invention consists in a direct-supply-faucet connection with the drain-pipe valve by combining a faucet having an axially turning or rotating barrel with said valve, through the intervention of a flexible or loose connection, substantially as hereinafter described, whereby all complicated mechanism interposed between the faucet and the valve to secure their proper and joint action is dispensed with.

Reference is to be had to the accompanying drawings, forming a part of this specification, in which similar letters of reference indicate corresponding parts in all the figures.

Figure 1:
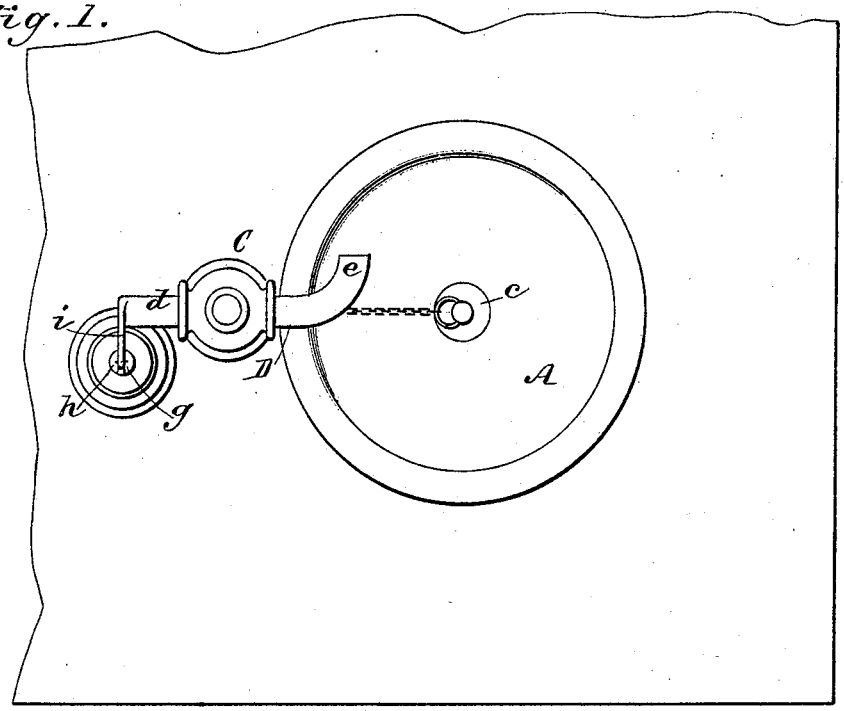
Figure 2:
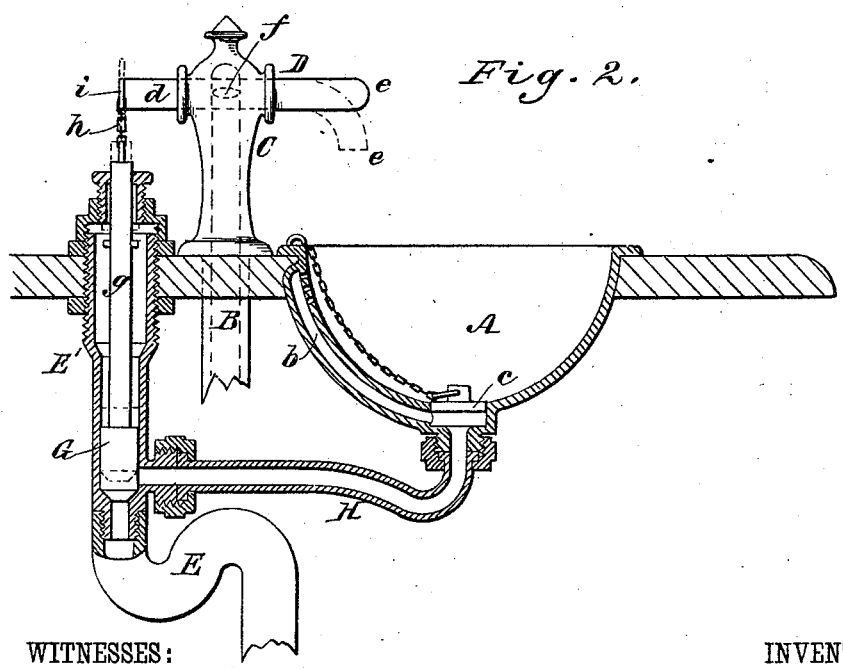

Figure 1 represents a plan view of a stationary wash-basin having a single supply-faucet with the invention applied, and Fig. 2 a partly sectional vertical view of the same. Fig. 3 is a plan of a wash-basin having two (or hot and cold) water-supply faucets with the invention applied, and Fig. 4 is a side view of the same.

In Figs. 1 and 2 of the drawings, A indicates the receptacle, bowl, or basin, provided with the usual overflow, b, and with a stopper, c, for retaining the water when supplying the basin, and for the escape of said water when required to run it off from the basin after use.

B is the water-supply pipe, here shown as arranged to pass up into a standard or housing, C, transversely, through which the supply-faucet D passes. This faucet is of the turning or rotatable kind—that is to say, its stem or barrel d is fitted to turn about its longitudinal axis by means of the bit or nozzle e as a handle, to let on the water or to shut it off, as required. To this end the stem or barrel d, which is arranged to project both in front and in rear of the housing C, is closed at its back end, and has a lateral opening, f, intertermediately of its length, in it, over the upper end of the supply-pipe B, and arranged so that when the nozzle e is turned into a horizontal position, or thereabout, the supply is shut off; but when the nozzle e is turned into a downward position the supply is turned on, as shown by full and dotted lines in Fig. 2.

E is the drain-pipe or trap portion thereof, having an upward extension formed by a valve case or box, E', in which is fitted the weighted plunger-valve G, and which is connected, immediately above the seat of said valve, by a branch pipe, H, with the discharge-opening from the basin. This is the valve hereinbefore referred to, and about which, separately, nothing here is claimed as new, and that serves, when automatically closing by its own weight, to exclude sewer or other bad gases or odors from passing through the basin into the apartment, but which, on being raised or opened, allows the waste water from the basin to pass off into the drain-pipe. The stem g of said valve, which projects upward and may be fitted with a screw-lock for holding the valve permanently closed when desired, is connected by a chain, h, or other flexible slotted loose or lifting attachment, with a crank or lifter, i, on the rear end portion of the stem d of the faucet, said lifter being so arranged that when the nozzle e of the faucet is turned down to let on the water into the basin the valve G is raised by it, as shown by dotted lines in Fig. 2, to provide a free escape for the water from the basin, after use, into the drain-pipe. In this way or by these means the faucet is made to directly open the valve controlling the drain-pipe without the intervention of separate levers or complicated devices, or to permit of the self-closing of said valve, according to the direction in which the faucet is turned to let the supply-water on or to shut it off.

Instead of the flexible connection or lifting attachment h, the stem g of the drain-pipe valve may have a plate or projection fast on it, and the lifter i operate beneath the same to raise the drain-pipe valve G when the faucet is turned on, but not controlling or interfering with the free downward or closing movement of said valve when the faucet is shut off.

Referring to Figs. 3 and 4 of the drawings, which show this last-described modification in connection with two faucets, the one of which may be used to supply hot water and the other cold water, h' is the plate or projection forming the lifting attachment on the stem g of the drain-pipe valve, under which either or both lifters i i on the rear ends of the stems or barrels d d of the two faucets act to raise or open said valve when either or both of the faucet-stems are turned to let on the supply, but not interfering with the free dropping or closing of said valve when the faucets are shut off.

When two faucets are used, then their stems or barrels d, which, as in the case of the single faucet hereinbefore described, are laterally perforated and are arranged in relation with independent supply-pipes, may pass in angling directions through independent housings C C, and instead of the nozzles e being integral parts of them, said nozzles may be fixtures in the housings and be arranged angling in relation with the stems, to discharge into the basin when the stems d, which are closed at both ends, are turned in proper directions for the purpose. In this case buttons or separate handles e' may be fitted on the forward-protruding or other portions of the two stems or barrels d, to provide for turning the latter to establish or shut off the supply through either fixed nozzle e. The stems d d are set angling in a converging direction toward the stem g of the drain-pipe valve, to bring both their lifters i under the lifting attachment h' on said stem g for operation, as hereinbefore described.

Having fully described my invention, I claim as new and desire to secure by Letters Patent—

1. The combination, with the basin or receptacle, the water-supply pipe thereto, and the standard carrying the supply-faucet, of a transversely-perforated axially-turning supply-faucet having its barrel arranged to project horizontally through said standard, and provided at or near its opposite projecting ends with means for turning it, and with an independent valve-lifting arm, the automatically-closing plunger-weighted trap-valve, with attached means for raising and opening it by said faucet-barrel lifting-arm, adapted to provide for the independent lifting of said valve when required, substantially as specified.

2. The combination of the basin A, the water-supply standards C C, the hot and cold water faucets having laterally-perforated barrels d d, arranged to project horizontally through said standards, the arms e' i on the opposite projecting ends or portions of said barrels, the drain-pipe connection E, the branch pipe H, the self-closing weighted-plunger trap-valve G, and valve case E', the valve-stem g, and attached means for raising said valve by the lifting-arms i of the faucets, essentially as described.

WILLIAM D. SCHUYLER.

Witnesses:
 EDWD. M. CLARK,
 C. SEDGWICK.